Patented Feb. 27, 1923.

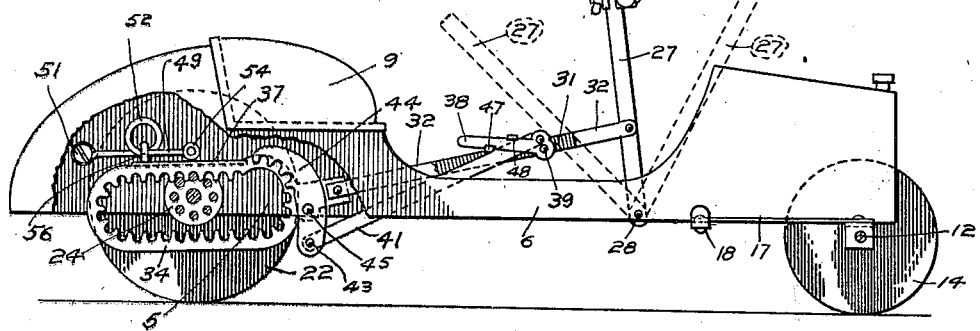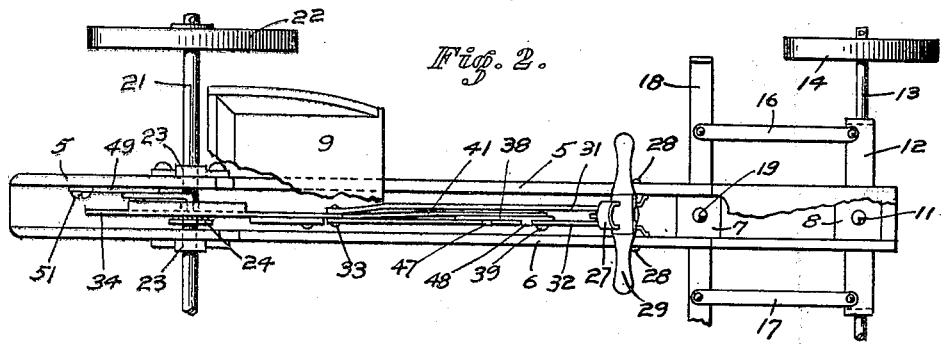

1,447,119

UNITED STATES PATENT OFFICE.

ROBERT B. BROWN, OF SAN FRANCISCO, CALIFORNIA, ASSIGNOR TO THOMAS MARK AND ARTHUR E. McDONALD, BOTH OF SAN FRANCISCO, CALIFORNIA.

VEHICLE PROPULSION MEANS.

Application filed April 14, 1920, Serial No. 375,113. Renewed June 3, 1922. Serial No. 565,745.

*To all whom it may concern:*

Be it known that ROBERT B. BROWN, a citizen of the United States, residing at San Francisco, in the county of San Francisco and State of California, has invented certain new and useful Improvements in Vehicle Propulsion Means of which the following is a specification.

This invention relates to a means of propulsion, and is particularly applicable to a child's vehicle. It is obvious, however, that the same movement may be applied in other places without departing from the spirit of the invention.

The principal object of this invention is to provide a movement which will be capable of converting reciprocating movement into rotary movement, and at the same time provide a point where the reciprocating and rotary elements are disconnected.

Another object is to provide means whereby the reciprocating element may be kept in constant mesh throughout its entire orbit of movement.

Other objects and advantages will be seen as the description proceeds.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the drawings:—

Figure 1 is a side elevation partly in cross section of my propulsion means as applied to a child's vehicle.

Figure 2 is a top plan view of Figure 1.

Figure 3 is a detail view of my propulsion means.

Figure 4 is a cross section taken on the line IV—IV of Figure 3, looking in the direction of the arrows.

Like numerals correspond to like parts in the several views.

The numerals 5 and 6 refer to side members suitably spaced and resembling in contour an automobile.

The blocks 7 and 8 are located between the forward ends of the side members 5 and 6, and serve to space these members one from the other. The seat 9, conveniently located near the rear of the side members 5 and 6 serves to space the rear ends of the side members.

At 11 I have shown a pivot supporting a cross bar 12 to which a front axle 13 is secured. This axle carries the front wheels 14. The cross member 12 is connected through links 16 and 17 to a foot rest 18, which foot rest is pivoted at 19 in the block 7. The rear ends of the side members 5 and 6 are supported by an axle 21 having wheels 22, one of which is keyed thereon. This axle passes through suitable bearings 23 attached to the side members 5 and 6, and is provided with a cog member which is made up of plates 24 having pins 25 riveted therein. These plates are placed so as to be spaced a suitable distance one from the other. This construction is best shown in Figure 4. It is also understood that the hub portions 26 of the plates 24 are rigidly attached to the axle 21.

At 27, I have shown a hand lever pivoted at 28 between the side members 5 and 6. A movable handle 29 is adapted to be moved upwardly or downwardly to vary the amount of leverage which may be applied to the lever 27. The numerals 31 and 32 refer to connector links extending rearwardly and downwardly and attached on opposite sides at the point 33 to a rack member 34 having internal teeth 35, and provided at one point with a cut away portion 36. This rack member 34 is provided along its upper edge with a track 37, the purpose of which will be hereinafter seen.

The numeral 38 refers to a trip lever pivoted at 39 to the link 32. Pivoted to this lever 38 is a link 41 pivoted at 42, and having its opposite end pivoted at 43 to a segment 44, which segment is pivoted at 45 to the rack 34. This segment carries teeth 46, the purpose of which will be hereinafter shown.

The lever 38 is provided with stops 47 and 48, the purpose of which is to limit the forward and rearward movement of the trip lever 38 when the stops 47 and 48 contact with the top of the link 32. The numeral 49 refers to a spring having one end attached by a screw 51 to the side member 5. This spring is provided with a coil 52 and a bent end 53. This end is bent at right angles to the major portion of the spring and carries a roller 54. A staple 56 limits the movement of the spring about the screw 51.

Referring now to the operation of my device, if the lever 27 is reciprocated about its pivot point 28, motion will be transmitted through the links 31 and 32 to the rack 34, and if the parts are in the position shown in Figure 1, the forward movement of the lever 27 will cause the rack to act upon the cog pins 25, which in turn will drive the shaft 21 and rotate the wheel 22 in a clockwise direction. This will cause the vehicle to move forwardly, and as the rack reaches its limit of forward movement, the rotating of the cog will cause the rack to move upwardly at the same time the track 37 has passed from under the roller 54, and as the rack moves upwardly and starts to move backwardly, the under side of the track will contact with the top of the roller 54. This contact will be maintained until the rack has reached its limit of backward movement, when it will start to drop. At this time, the cog will enter the cut away portion 36 and the vehicle will now be free to coast. As soon as it is desired to again bring the rack into operation, forward movement of the lever 27 will accomplish the desired result.

When it is desired to cause the vehicle to move steadily forward, the trip lever 38 is thrown to the dotted line position of Figure 3. This causes the pivot point 42 to move to the point A, Figure 3, and through the link 41 moves the segment 44 into the dotted line position.

It will thus be seen that this completes the orbit arangement of teeth, so that the rotation of the cog will cause the rack 34 to continue to move throughout a given orbit without at any time stopping it until the trip lever 38 is again thrown to the full line position.

It will be noted that the thickness of the roller 54 and rail 37 are equal to the distance from the outer surface of the cog pins 25 to the depth of the rack teeth. This permits the roller 54 to remain in contact with the upper and lower surfaces of the rail 37 when the rack is in its lower and upper positions. The purpose of the spring 49 is to allow the rack 34 to move slightly for the purpose of causing proper meshing of the cog and the teeth of the rack when the cog leaves the cut away portion 36. This spring also serves the purpose of holding the rack teeth in intimate engagement with the cog, thereby preventing undue noise.

It will thus be seen that I have created a movement which will allow a child to propel a vehicle over a surface through the reciprocation of a handle, and when the child so desires, the coasting position may be assumed, which will allow the rear wheels 22 to rotate without the reciprocation of the rack member 34, and that when it is desired this coasting feature can be eliminated, as well as noise incidental to the cog dropping into and out of the cut away portion should this segmental member be omitted, and it will convert the reciprocating into rotary motion continuously.

Having thus described my invention, what I claim as new and desire to secure by Letters Patent of the United States, is as follows:—

1. In a device of the character described, the combination of a vehicle having a driven axle, a cog mounted on said axle, a rack surrounding said cog and having inwardly disposed teeth, a lever attached to said vehicle, links attached to said lever and said rack, and means whereby the teeth of said rack may be disengaged from said cog.

2. A propulsion means comprising a vehicle having a driven axle, a cog mounted on said axle, a pivoted member forward of said axle, links attached to said pivoted member, a rack surrounding said cog and attached to said links, a trip lever pivoted to one of said links, a segmental member pivoted to said rack, a link connecting said segmental member and said trip lever, teeth formed on said rack and said segmental member, said segmental member being capable of being moved out of the path of movement of said cog.

3. A propulsion means for a vehicle provided with a driven axle, a cog secured to said axle, a rack surrounding said cog and provided throughout a portion of its length with cog engaging teeth, and having a portion of its length cut away for the purpose of allowing the rack to idle as the cog rotates, and means for reciprocating said rack to impart rotary movement to said cog.

4. A propulsion means for a vehicle provided with a driven axle, a cog secured to said axle, a rack surrounding said cog and provided throughout a portion of its length with cog engaging teeth, and having a portion of its length cut away for the purpose of allowing the rack to idle as the cog rotates, means for reciprocating said rack to impart rotary movement to said cog, and means for bridging said cut away portion to form a continuous rack.

In testimony whereof I affix my signature.

ROBERT B. BROWN.